(12) United States Patent
Hong et al.

(10) Patent No.: US 9,142,822 B2
(45) Date of Patent: Sep. 22, 2015

(54) CORE PACK MANUFACTURING APPARATUS

(75) Inventors: Jintae Hong, Yongin-si (KR); Jaeuk Ryu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 587 days.

(21) Appl. No.: 12/955,830

(22) Filed: Nov. 29, 2010

(65) Prior Publication Data

US 2011/0192020 A1 Aug. 11, 2011

(30) Foreign Application Priority Data

Feb. 10, 2010 (KR) .................. 10-2010-0012455

(51) Int. Cl.
*H01M 2/04* (2006.01)
*H01M 2/20* (2006.01)
*H01M 10/42* (2006.01)

(52) U.S. Cl.
CPC ............ *H01M 2/202* (2013.01); *H01M 10/425* (2013.01); *Y10T 29/49108* (2015.01); *Y10T 29/49211* (2015.01); *Y10T 29/53135* (2015.01)

(58) Field of Classification Search
CPC ............................... H01M 2/04; H01M 2/021
USPC .................... 429/65, 100, 151, 163
See application file for complete search history.

(56) References Cited

U.S. PATENT DOCUMENTS

| 2006/0035142 | A1 | 2/2006 | Chung et al. |
| 2008/0081254 | A1 | 4/2008 | Kim et al. |
| 2010/0304190 | A1 | 12/2010 | Chung et al. |

FOREIGN PATENT DOCUMENTS

| CN | 1930702 A | 3/2007 |
| CN | 101154719 A | 4/2008 |
| KR | 10-2003-0086830 A | 11/2003 |
| KR | 20-0397368 | 9/2005 |
| KR | 10-2007-0010475 A | 1/2007 |
| KR | 10-2007-0108758 A | 11/2007 |
| KR | 10-2008-0025865 A | 3/2008 |
| KR | 10-2009-0118197 A | 11/2009 |

OTHER PUBLICATIONS

Korean Office Action dated May 18, 2011 issued by the KIPO for corresponding Patent Application No. 10-2010-0012455, 3 pages.
KIPO Notice of Allowance, dated Nov. 30, 2011, for KR patent application No. 10-2010-0012455, 5 pages.
SIPO Office action dated May 9, 2013, for corresponding Chinese Patent application 201110020099.8, (7 pages).

*Primary Examiner* — Tracy Dove
(74) *Attorney, Agent, or Firm* — Christie, Parker & Hale, LLP

(57) ABSTRACT

A core pack manufacturing apparatus for preventing or substantially preventing an iron from contacting a cell or a protective circuit part in a process of soldering a connection tab of the cell to a connection terminal of the protective circuit part. A core pack manufacturing apparatus for soldering a connection tab connected to a cell to a connection terminal of a protective circuit part includes a cap including a first cover configured to cover the cell, and a second cover extending from a side of the first cover and configured to cover the protective circuit part, the second cover having an opening part configured to expose the connection tab and the connection terminal through the second cover for soldering.

3 Claims, 3 Drawing Sheets

CORE PACK MANUFACTURING APPARATUS

CROSS-REFERENCE TO RELATED APPLICATION

This application claims priority to and the benefit of Korean Patent Application No. 10-2010-0012455, filed on Feb. 10, 2010 in the Korean Intellectual Property Office, the entire content of which is incorporated herein by reference.

BACKGROUND

1. Field

Aspects of embodiments of the present invention relate to a core pack manufacturing apparatus.

2. Description of the Related Art

In general, a core pack is formed by coupling a protective circuit part to a cell, and a secondary battery includes the core pack.

The cell typically includes an electrode assembly rolled up in a jelly-roll shape, a can having an open side to accommodate the electrode assembly, and a cap assembly coupled to the open side of the can to seal the can.

The protective circuit part is a safety device that causes a short circuit to prevent a current flow when an inner temperature of a cell is greatly increased or when a voltage of a cell is increased by overcharging, so as to prevent a burning or explosion of the cell. The protective circuit part typically includes a protective circuit board in which various devices are mounted on a printed circuit board (PCB), and is electrically connected to a cell through a conductor referred to as a connection tab.

Typically, the connection tab electrically connected to the cell is electrically connected to a connection terminal of the protective circuit part through a soldering process. However, if an iron undesirably contacts the cell in the soldering process, the cell may be damaged or the cell may be shorted, thereby causing a defect.

Also, if the iron contacts the protective circuit part, a defect may be caused. Typically, such a defect may be caused more frequently as the distance between a cell and a protective circuit part decreases.

SUMMARY

An aspect of the present invention provides a core pack manufacturing apparatus for preventing or substantially preventing an iron from contacting a cell and a protective circuit part in a process of soldering a connection tab of the cell to a connection terminal of the protective circuit part.

According to an embodiment of the present invention, a core pack manufacturing apparatus for soldering a connection tab connected to a cell to a connection terminal of a protective circuit part includes a cap, wherein the cap includes: a first cover configured to cover the cell; and a second cover extending from a side of the first cover and configured to cover the protective circuit part, wherein the second cover has an opening part configured to expose the connection tab and the connection terminal through the second cover for the soldering.

The first and second covers may be integrally formed.

The opening part may include a hole formed through the second cover.

The opening part may include a recess at a side of the second cover with respect to the protective circuit part.

The apparatus may further include a position setting part on the cell or the protective circuit part for setting a position of the cap.

The position setting part may include a line or a point marked on the cell for locating a side surface of the cap at the position setting part.

The position setting part may include a first extension part extending from a side of the first cover opposite the second cover and configured to surround the cell; and a second extension part extending from a side of the second cover opposite the first cover and configured to surround the protective circuit part.

According to another embodiment of the present invention, a method of manufacturing a core pack including a cell and a protective circuit part using a core pack manufacturing apparatus including a cap, the method including: covering the cell with a first cover of the cap; covering the protective circuit part with a second cover of the cap extending from a side of the first cover; and soldering a connection tab connected to the cell to a connection terminal of the protective circuit part through an opening part of the second cover.

The method may further include locating a side surface of the cap using a line or a point marked on the cell.

The method may further include surrounding the cell with a first extension part of the core pack manufacturing apparatus extending from a side of the first cover opposite the second cover; and surrounding the protective circuit part with a second extension part of the core pack manufacturing apparatus extending from a side of the second cover opposite the first cover.

BRIEF DESCRIPTION OF THE DRAWINGS

The accompanying drawings are included to provide a further understanding of embodiments of the present invention, and are incorporated in and constitute a part of this specification. The drawings illustrate some exemplary embodiments of the present disclosure and, together with the description, serve to explain principles of the present invention, in which.

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

Figure 1:
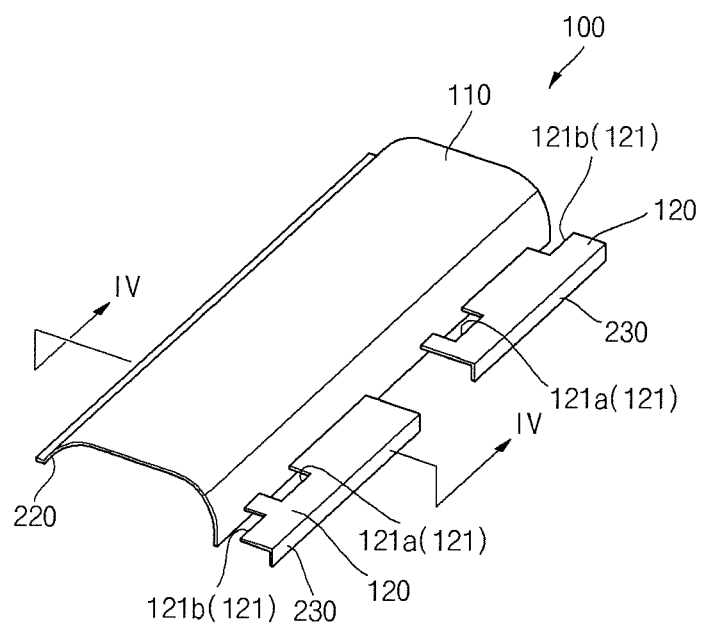
FIG. 1 is a perspective view illustrating a cap of a core pack manufacturing apparatus according to an embodiment of the present invention.
Figure 2:
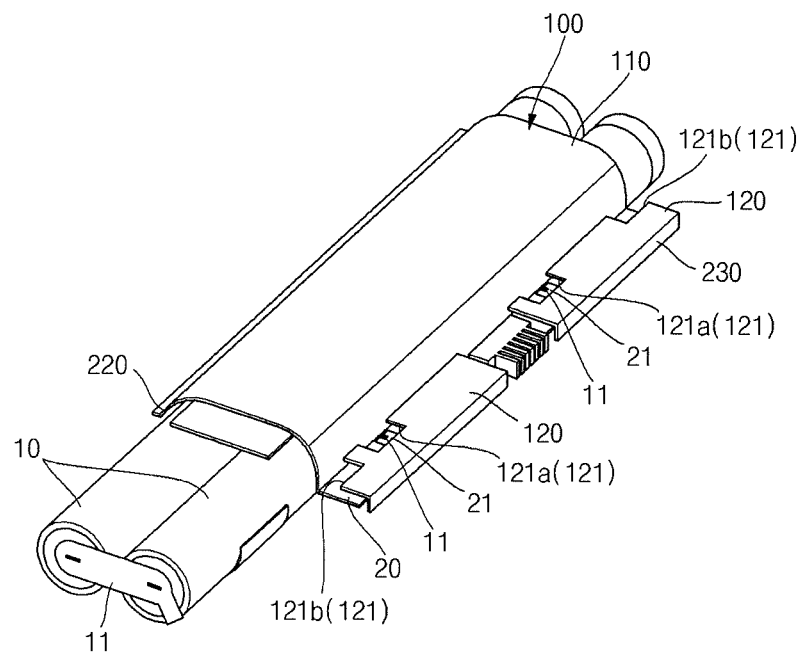
FIG. 2 is a perspective view illustrating a state in which the cap of the core pack manufacturing apparatus of FIG. 1 is installed on cells and a protective circuit part.

FIG. 1 is a perspective view illustrating a cap of a core pack manufacturing apparatus according to an embodiment of the present invention. FIG. 2 is a perspective view illustrating a state in which the cap of the core pack manufacturing apparatus of FIG. 1 is installed on cells and a protective circuit part.

Referring to FIGS. 1 and 2, the core pack manufacturing apparatus according to an embodiment of the present invention includes a cap 100 for soldering connection tabs 11 connected to cells 10 to connection terminals 21 of a protective circuit part 20.

The cap 100, in one embodiment, includes a first cover 110 configured to cover the cells 10, and a second cover 120 configured to cover the protective circuit part 20. In one embodiment, the first and second covers 110 and 120 are integrally formed. The second cover 120 includes an opening part 121 configured to expose the connection tabs 11 and the connection terminals 21 for soldering. Thus, since the cap 100 includes the first and second covers 110 and 120, the protective circuit part 20 and the cells 10 are protected even when an iron (not shown) is disposed outside of the opening part 121 in a soldering process. That is, even when an iron (not shown) is disposed at the cells 10 outside of the opening part 121, the first cover 110 protects the cells 10 to prevent or substantially prevent defects, such as damage of cases of the cells 10 and/or short circuits of the cells 10. In addition, even when an iron (not shown) is disposed at the protective circuit part 20, the second cover 120 protects the protective circuit part 20 to prevent or substantially prevent defects, such as damage and/or a short circuit of the protective circuit part 20. As a result, since defects can be prevented or substantially prevented, and the soldering process can be facilitated, the productivity can be improved.

Furthermore, since the first cover 110 and the second cover 120 are integrally formed, in one embodiment, the cells 10 and the protective circuit part 20 can be covered in a single process, so as to improve working speed.

In one embodiment, the opening part 121 may include a hole (or opening) 121a passing through the second cover 120. Alternatively, or in addition, the opening part 121 may include a recess (or notch) 121b recessed at a side of the second cover 120 (e.g., at one or both of the left or right sides) with respect to the protective circuit part 20. The position of the opening part 121 (that is, the hole 121a and/or the recess 121b) may be selected according to thermal characteristics of a core pack. That is, the position where thermal characteristics of the core pack are safest may be used for selecting the position of the opening part 121. In one embodiment, when the opening part 121 is disposed in a middle portion (i.e. a portion other than three corners or three edges of the second cover 120), the opening part 121 is the hole 121a. Further, in one embodiment, when the opening part 121 is disposed at a side (e.g., the left or right side), the opening part 121 may be the recess 121b. In addition, the position of the opening part 121 (that is, the hole and/or the left or right recess) may be selected according to the arrangement of a process line. That is, in one embodiment, when an operator or a robot requires the middle portion according to the arrangement of a process line, the opening part 121 is the hole 121a, and, in one embodiment, when the operator or the robot requires the left or right side, the opening part 121 is the recess 121b.

Figure 3:
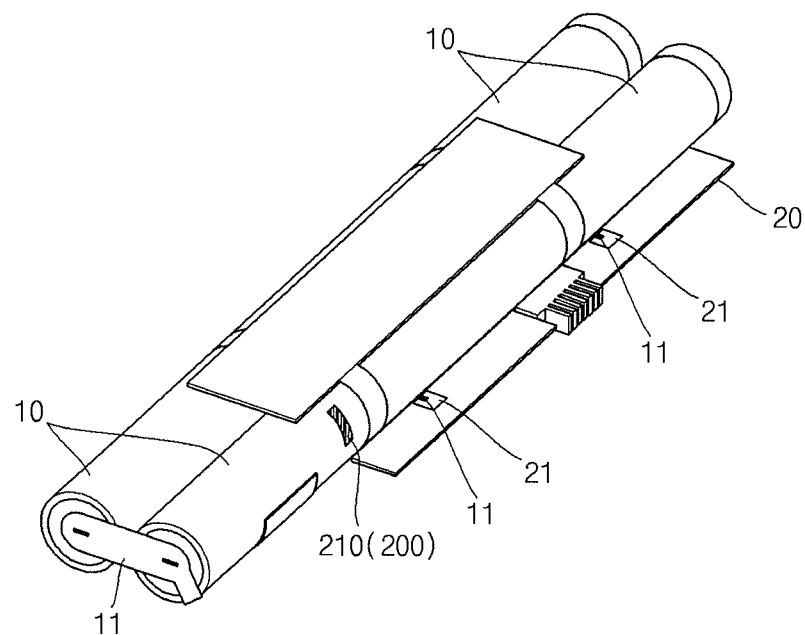
FIG. 3 is a perspective view illustrating a position setting part disposed on a cell, in a state in which the cap of the core pack manufacturing apparatus of FIG. 1 has been removed from the cells.
Figure 4:
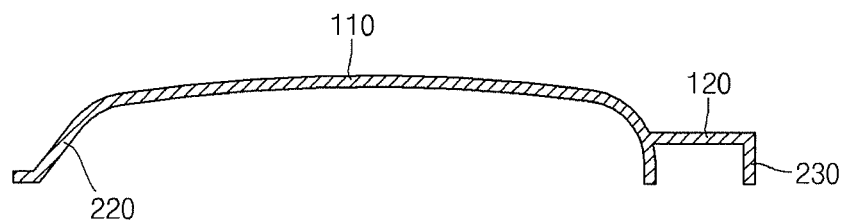
FIG. 4 is a cross-sectional view of the core pack manufacturing apparatus of FIG. 1 taken along line IV-IV.

Referring to FIGS. 3 and 4, the core pack manufacturing apparatus according to one embodiment may further include a position setting part 200 for setting the position of the cap 100 at one of the cells 10 and the protective circuit part 20.

FIG. 3 is a perspective view illustrating the position setting part disposed on the cell, in a state in which the cap of the core pack manufacturing apparatus is removed from the cells according to one embodiment. FIG. 4 is a cross-sectional view of the core pack manufacturing apparatus of FIG. 1 taken along line IV-IV.

Referring to FIG. 3, the position setting part 200 may include a line 210 (or point) marked on the cell 10 to dispose a side surface of the cap 100 at the position setting part 200. That is, since the operator or the robot can find the marked line 210 (or point) at one time, working time, as well as defects, can be decreased.

Referring to FIG. 4, in one embodiment, the position setting part 200 includes a first extension part 220 extending from a surface of the first cover 110 opposite to the second cover 120 and configured to surround a portion of the cell 10. Further, in one embodiment, the position setting part 200 includes a second extension part 230 extending from a surface of the second cover 120 opposite to the first cover 110 and configured to surround a portion of the protective circuit part 20. Thus, in one embodiment, when a position of the cap 100 in one direction (e.g., the left and right positions) is set by the marked line 210 (or point), a position of the cap 100 in another direction (e.g., the front and rear positions) are accurately and easily set through the first and second extension parts 220 and 230 when placing the cap 100 on the cells 10 and the protective circuit part 20.

As described above, aspects of embodiments of the core pack manufacturing apparatus of the present invention include the following advantages.

According to one embodiment, since the cap 100 for soldering is integrally formed to protect the cells 10 and the protective circuit part 20, even when an iron is undesirably disposed at the cells 10 or the protective circuit part 20 in the soldering process, the cells 10 and the protective circuit part 20 can be protected from a defect such as damage and/or a short circuit due to contact with the iron. For example, the cap 100 can be effectively used in a core pack having a small distance between the cells 10 and the protective circuit part 20.

In addition, since the position setting part 200 is further provided, in one embodiment, the soldering cap 100 can be quickly installed. As a result, soldering defects and working time can be significantly decreased.

Some exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for manufacturing a core pack including a cell, a connection tab connected to the cell and a protective circuit part having a connection terminal, the apparatus including a cap for covering the core pack,
    wherein the cap comprises:
    a first cover and a second cover integrally formed with the first cover and extending in a first direction from a side of the first cover, the second cover having an opening part formed thereon;
    a first extension part extending in a direction from a side of the first cover opposite the second cover; and
    a second extension part extending from a side of the second cover opposite the first cover,
    whereby the cap is configured to cover a core pack such that the first cover covers a cell of the core pack, the second cover covers a protective circuit part of the core pack, and a connection tab connected to the cell and a connection terminal of the protective circuit part are exposed through the opening part of the second cover.

2. The apparatus as claimed in claim 1, wherein the opening part includes a hole formed through the second cover.

3. The apparatus as claimed in claim 1, wherein the opening part includes a recess.

\* \* \* \* \*